Patented Sept. 14, 1948

2,449,520

UNITED STATES PATENT OFFICE 2,449,520

3,5-DIAMINO-4-HYDRO-THIOTRIAZINE-1-DIOXIDE RESINS

Henry A. Walter, Longmeadow, Mass., assignor to Monsanto Chemical Company, St. Louis, Mo., a corporation of Delaware No Drawing. Application May 10, 1947, Serial No. 747,335

5 Claims. (Cl. 260—67.6)

This invention relates to new aminoplasts. More particularly, the invention relates to resinous reaction products of 3,5-diamino-4-hydro-thiotriazine-1-dioxide.

An object of this invention is to provide new aminoplasts.

Another object of this invention is to provide resinous reaction products of aldehydes and 3,5-diamino-4-hydro-thiotriazine-1-dioxide.

A further object is to provide reaction products of alcohols, aldehydes and 3,5-diamino-4-hydro-thiotriazine-1-dioxide.

These and other objects are attained by reacting 3,5-diamino-4-hydro-thiotriazine-1-dioxide with aldehydes and alcohols.

The following examples are given in illustration and are not intended to limit the scope of this invention. Where parts are mentioned, they are parts by weight.

Example I 163 parts of 3,5-diamino-4-hydro-thiotriazine-1-dioxide were suspended in a mixture of 486 parts of formalin (37% formaldehyde) and 270 parts of methanol. The pH of the suspension was adjusted to about 8.3 with dilute potassium hydroxide. The suspension was then heated under refluxing conditions at atmospheric pressure for about one hour, during which time a clear solution was formed. The resultant solution was evaporated to remove methanol, water and excess formaldehyde to yield a slightly yellow fusible resin which on further heating with or without catalyst, could be cured to an insoluble, infusible product.

3,5-diamino-4-hydro-thiotriazine-1-dioxide reacts with aldehydes to form extremely valuable resins. For example, it may be reacted with saturated or unsaturated aliphatic, alicyclic, or aromatic aldehydes such as formaldehyde, acetaldehyde, propionaldehyde, butyraldehyde, benzaldehyde, cinnamaldehyde, furfural, acrolein, methacrolein, crotonaldehyde, etc., to form substances which range from water-soluble products to insoluble, infusible hard resins. Mixtures of aldehydes may be used. The amount of aldehyde may vary from about 1 to 4 or more mols per mol of 3,5-diamino-4-hydro-thiotriazine-1-dioxide.

The soluble, fusible resins produced by the reaction between aldehydes and 3,5-diamino-4-hydro-thiotriazine-1-dioxide may be further modified by reaction with one or more saturated or unsaturated aliphatic and aromatic alcohols and phenols such as methanol, ethanol, propanol, butanol, benzyl alcohol, cinnamyl alcohol, allyl alcohol, phenol, cresol, etc. The ratio of alcohol to the aldehyde - 3,5 - diamino - 4 - hydro - thiotriazine-1-dioxide condensation product may be varied from 1 to 4 or more mols of alcohol per mol of resin.

Example II

To the water-methanol solution of a formaldehyde 3,5-diamino-4-hydro-thiotriazine-1-dioxide resin made as shown in Example I were added 500 parts of methanol and the solution was cooled to about 30° C. 60 cc. of concentrated sulfuric acid were added slowly while maintaining the 30° C. temperature. The solution was then heated to about 40° C. until it became clear, whereupon the temperature was again lowered to about 30° C. and the reaction continued for about 1 hour. The resultant solution was made alkaline to a pH of approximately 8.3 with potassium hydroxide. The solution was then filtered and evaporated under vacuum. A resinous material was produced which was soluble in water and aliphatic alcohols.

The alcohol-modified resins may be produced in a single step by refluxing 3,5-diamino-4-hydro-thiotriazine-1-dioxide with the aldehyde and the alcohol in the presence of an acid catalyst.

The 3,5-diamino-4-hydro-thiotriazine-1-dioxide used to make the resins of this invention is a new compound which is disclosed and claimed in my co-pending application Serial No. 642,434, filed January 19, 1946, of which this application is a continuation-in-part.

3,5 - diamino-4-hydro-thiotriazine -1- dioxide may be made by reacting dicyandiamide with sulfamic acid, its salts or its esters as shown in the following examples.

Example III 300 parts of anhydrous sulfamic acid (3 mols) and 255 parts of dicyandiamide (3 mols) were mixed, triturated, and then heated to about 120° C. at which temperature the mixture fused. Heating at about 120° C. was continued for about 1 hour whereupon the product was cooled and comminuted. The comminuted reaction product was extracted with large amounts of dilute aqueous sodium hydroxide and a precipitate obtained from the dilute solution by the addition of acetic acid. The precipitate thus obtained was a white, granular powder which, upon analysis, was found to be 3,5-diamino-4-hydro-thiotriazine-1-dioxide. It was insoluble in water and dilute acid and soluble in dilute alkali.

The probable structural formula of the compound is

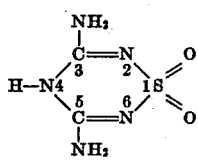

Example IV 120 parts of dry sodium sulfamate (1 mol) and 85 parts of dicyandiamide (1 mol) were thoroughly blended and then heated to a temperature of 205–210° C. at which temperature the mixture fused. The mixture was further heated at 205–210° C. for about 1 hour, then cooled and dissolved in water. The reaction product was precipitated from the resulting solution with acetic acid and was found, on analysis, to be 3,5-diamino-4-hydro-thiotriazine-1-dioxide.

Sulfamic acid and sodium sulfamate are shown in the examples as components for the reaction with dicyandiamide. They may be replaced, in part or in whole, by other sulfamic acid salts, e. g., ammonium, potassium, calcium, barium, etc., sulfamates, or by organic esters of sulfamic acid such as ethyl, propyl, butyl sulfamates, etc. The molar ratio of dicyandiamide to sulfamic acid, or sulfamic acid derivative, should be kept at about 1:1. A slight excess of either component leads to undesirable by-products which are difficult to separate from the desired 3,5-diamino-4-hydro-thiotriazine-1-dioxide. A substantial excess of either component products different and undesired products.

The temperature of the reaction will vary according to the nature of the sulfamic acid or its derivative which is used to react with the dicyandiamide. In each case, however, the temperature must be high enough to fuse the two components, but not high enough to cause decomposition of either component.

The length of the temperature treatment of the fused mixture will vary according to the temperature used. For example, if the fusion temperature of the mixture is used for the reaction, the reaction must be carried on for about 1 hour, but if temperatures higher than the fusion temperature are employed, the reaction time may be materially shortened.

It will be noted that the conditions shown in the examples for the production of the thiotriazine are substantially anhydrous up to the completion of the reaction. It is necessary to maintain substantially anhydrous conditions since the presence of water along with sulfamic acid, or sulfamic acid derivative, would cause a breakdown of dicyandiamide and would yield sulfamic acid derivatives of dicyandiamide decomposition products rather than the compound of this invention.

Acetic acid was used in the examples to precipitate 3,5-diamino-4-hydro-thiotriazine-1-dioxide from the alkaline solution. Other acids or acid-producing materials, such as carbon dioxide, sulfur trioxide, hydrochloric acid, sulfuric acid, propionic acid, etc., may be used as the precipitating agent. The acidic precipitating agents must be used in amounts at least sufficient to render the solution slightly acid.

The aldehyde condensation products of 3,5-diamino-4-hydro-thiotriazine-1-dioxide may be used in molding compositions, textile treating compositions, coating compositions and adhesive compositions and are especially useful where acid-resistant compositions are needed. They may also be modified to provide ion exchange resins of high capacity. They may be cured to the insoluble, infusible state by the application of heat with or without the addition of curing catalysts, generally of an acid nature.

The alcohol modified resins of this invention may be used in adhesives, paper treating compositions, textile treating compositions, coating compositions, etc. They are especially useful in treating textiles to provide shrink resistance, crease resistance, etc., since they diminish the chlorine pickup of such treated textiles in bleaching operations. The ethers are also compatible with alkyd resins and serve to improve the hardness and gloss of the alkyd resins. They may be cured to the insoluble, infusible state by the application of heat with or without the addition of curing catalysts.

The resins of this invention may be used alone or blended with various conventional ingredients such as cellulosic or mineral fillers, natural or synthetic resins, drying oils, lubricants, dyes, pigments, etc.

It is obvious that many variations may be made in the processes and products of this invention without departing from the spirit and scope thereof as defined in the appended claims.

What is claimed is:

1. The reaction product of 3,5-diamino-4-hydro-thiotriazine-1-dioxide and an aldehyde.

2. The reaction product of claim 1 wherein the aldehyde is formaldehyde.

3. The reaction product of 3,5-diamino-4-hydro-thiotriazine-1-dioxide, an aldehyde and a compound taken from the group consisting of alcohols and phenols.

4. The reaction product of claim 3 wherein the aldehyde is formaldehyde.

5. The reaction product of claim 4 wherein the alcohol is methanol.

HENRY A. WALTER.